US009176917B2

(12) United States Patent
Myrah et al.

(10) Patent No.: US 9,176,917 B2
(45) Date of Patent: Nov. 3, 2015

(54) SAS LATENCY BASED ROUTING (71) Applicant: Hewlett-Packard Development Company, L.P., Houston, TX (US)

(72) Inventors: Michael G Myrah, Sammamish, WA (US); Balaji Natrajan, Spring, TX (US); Rodrigo Stoll Martins Machado, Porto Alegre (BR)

(73) Assignee: Hewlett-Packard Development Company, L.P., Houston, TX (US)

( * ) Notice: Subject to any disclaimer, the term of this patent is extended or adjusted under 35 U.S.C. 154(b) by 374 days.

(21) Appl. No.: 13/781,293

(22) Filed: Feb. 28, 2013

(65) Prior Publication Data

US 2014/0244879 A1    Aug. 28, 2014

(51) Int. Cl.
G06F 13/00 (2006.01)
G06F 13/40 (2006.01)

(52) U.S. Cl.
CPC .................................. *G06F 13/409* (2013.01)

(58) Field of Classification Search
USPC .................................. 709/238–244; 710/216
See application file for complete search history.

(56) References Cited

U.S. PATENT DOCUMENTS

| | | | | |
|---|---|---|---|---|
| 4,967,345 A * | 10/1990 | Clarke et al. | ................... | 709/241 |
| 5,870,564 A * | 2/1999 | Jensen et al. | ................... | 709/241 |
| 5,881,243 A * | 3/1999 | Zaumen et al. | ............... | 709/241 |
| 6,061,736 A * | 5/2000 | Rochberger et al. | .......... | 709/241 |
| 6,067,572 A * | 5/2000 | Jensen et al. | ................... | 709/241 |
| 6,675,237 B1 * | 1/2004 | Asaad et al. | ..................... | 710/41 |
| 7,020,086 B2 * | 3/2006 | Juttner et al. | .................. | 370/238 |
| 7,185,104 B1 * | 2/2007 | Thorup et al. | ................ | 709/235 |
| 7,395,351 B1 * | 7/2008 | Nucci et al. | ..................... | 709/242 |
| 7,519,734 B1 * | 4/2009 | Dumitriu et al. | .............. | 709/238 |
| 7,584,319 B1 * | 9/2009 | Liao et al. | ...................... | 710/317 |
| 7,747,720 B2 * | 6/2010 | Toebes et al. | ................. | 709/223 |
| 7,782,867 B2 * | 8/2010 | Suzuki et al. | ............. | 370/395.31 |
| 7,792,989 B2 * | 9/2010 | Toebes et al. | ................. | 709/238 |
| 7,898,957 B2 * | 3/2011 | Lea et al. | ....................... | 370/235 |
| 7,953,889 B2 | 5/2011 | Suganthi et al. | | |
| 8,396,066 B1 * | 3/2013 | Banerjee et al. | ............. | 370/392 |
| 8,693,340 B2 * | 4/2014 | Schwager et al. | ............ | 370/238 |
| 8,745,267 B2 * | 6/2014 | Luecke et al. | ................ | 709/241 |

(Continued)

FOREIGN PATENT DOCUMENTS

WO    WO 02103961 A1 * 12/2002    .............. H04L 12/26

OTHER PUBLICATIONS

Sun ZFS Storage 7000 System Administration Guide, PartNo: 820-4167-13 Rev. A, Nov. 2010, http://docs.oracle.com/cd/E22471_01/pdf/820-4167.pdf, 430 pps.

*Primary Examiner* — Paul R Myers
(74) *Attorney, Agent, or Firm* — Hewlett-Packard Patent Department (57) ABSTRACT Techniques for operating a serial attached SCSI (SAS) expander that includes a latency table comprising entries of outbound PHYS with latency values associated with connections between inbound PHYs and outbound PHYs. A storage management module to, in response to receipt of a command from an initiator device associated with an inbound PHY to route data to a target device associated with an outbound PHY, select from the latency table a random outbound PHY from among a plurality of outbound PHYs, wherein the random selection is based on weighted average of latency values of the outbound PHY entries of the latency table.

17 Claims, 4 Drawing Sheets

(56) References Cited

U.S. PATENT DOCUMENTS

| | | | |
|---|---|---|---|
| 8,762,570 B2* | 6/2014 | Qian et al. | 709/241 |
| 2004/0146056 A1* | 7/2004 | Martin | 370/401 |
| 2005/0094633 A1* | 5/2005 | Varanasi et al. | 370/389 |
| 2006/0101171 A1* | 5/2006 | Grieff et al. | 710/36 |
| 2008/0168135 A1 | 7/2008 | Redlich et al. | |
| 2009/0125655 A1* | 5/2009 | Jones et al. | 710/104 |
| 2011/0191637 A1 | 8/2011 | Wight et al. | |
| 2011/0267952 A1* | 11/2011 | Ko et al. | 370/237 |
| 2013/0198368 A1* | 8/2013 | Patterson et al. | 709/224 |
| 2013/0219081 A1* | 8/2013 | Qian et al. | 709/241 |

* cited by examiner

SAS LATENCY BASED ROUTING

BACKGROUND

Serial attached small computer system interface (SAS) is a communications protocol for enabling communications between computer devices. According to the SAS protocol specification, SAS devices include initiator devices, target devices, and expander devices. Initiator devices can be devices that can begin a SAS data transfer, while target devices may be devices to which initiator devices transfer data. Expander devices may be devices that facilitate data transfer between multiple initiator devices and multiple target devices. The SAS protocol utilizes a point-to-point bus topology. Therefore, if initiator devices are required to connect to multiple target devices, direct connections can be established between initiator devices and each individual target device to facilitate each individual data transfer between the initiator devices and each individual target devices. Expander devices can manage connections and data transfer between multiple initiator devices and multiple target devices. A SAS fabric can include a network of initiator devices, target devices and expander devices.

BRIEF DESCRIPTION OF THE DRAWINGS

Certain examples are described in the following detailed description and in reference to the drawings, in which.

DETAILED DESCRIPTION OF SPECIFIC EXAMPLES

A explained above, a SAS fabric can include a network of initiator devices, target devices and expander devices configured to communicate according to the SAS protocol specification. For instance, a SAS fabric can comprise hosts or server computers configured as initiator devices and storage resources such as storage subsystems configured as target devices. In some cases, expander devices can receive from initiator devices requests to establish connections with target devices and to exchange data with the target devices. In a SAS environment, expander devices, initiator devices and target devices can include communication ports with PHYs which are communication structures to provide communication means for transmitting and receiving data between devices. The expanders may be configured to arbitrate from among a plurality of PHYs to select PHYs to establish connections for communication and then forward or propagate the connection requests to other subsequent or further expanders which may also have to arbitrate for PHYs. For example, an expander may receive from an initiator device a connection request to establish a connection for communication to route data between the initiator device and the target device. The expander device may respond by checking a route table with address information associated with the target device and identify PHYs associated with the target device. However, the expander device when performing the arbitration process may determine that a PHY may not be available for communication and then have to wait for the PHY to become available or proceed to select another PHY to establish a connection for communication. The process to establish connections for communication may include the arbitration process which may introduce time delays or connection latency. It may be desirable to provide techniques that can select PHYs to establish connections for communications that can reduce the time delay or connection latency.

In some examples of the present application, techniques are provided that can select PHYs to establish connections for communication that may help reduce time delay or communication latency and thereby improve performance of a system. In one example of the present application, described is a SAS expander that includes a latency table comprising entries of outbound PHYs with latency values associated with connections between inbound PHYs and outbound PHYs. A storage management module is provided that can, in response to receipt of a command from an initiator device associated with an inbound PHY to route data to a target device associated with an outbound PHY, select from the latency table a random outbound PHY from among the plurality of outbound PHYs, wherein the random selection is based on weighted average of latency values of the outbound PHY entries of the latency table. In this manner, as explained below in further detail, in some examples of the present application, techniques are disclosed that can help improve the performance of SAS fabrics by providing functionality or means to help select connections for communications to route data with multiple pathways, such as a SAS fabric with loops, to target devices.

Figure 1:
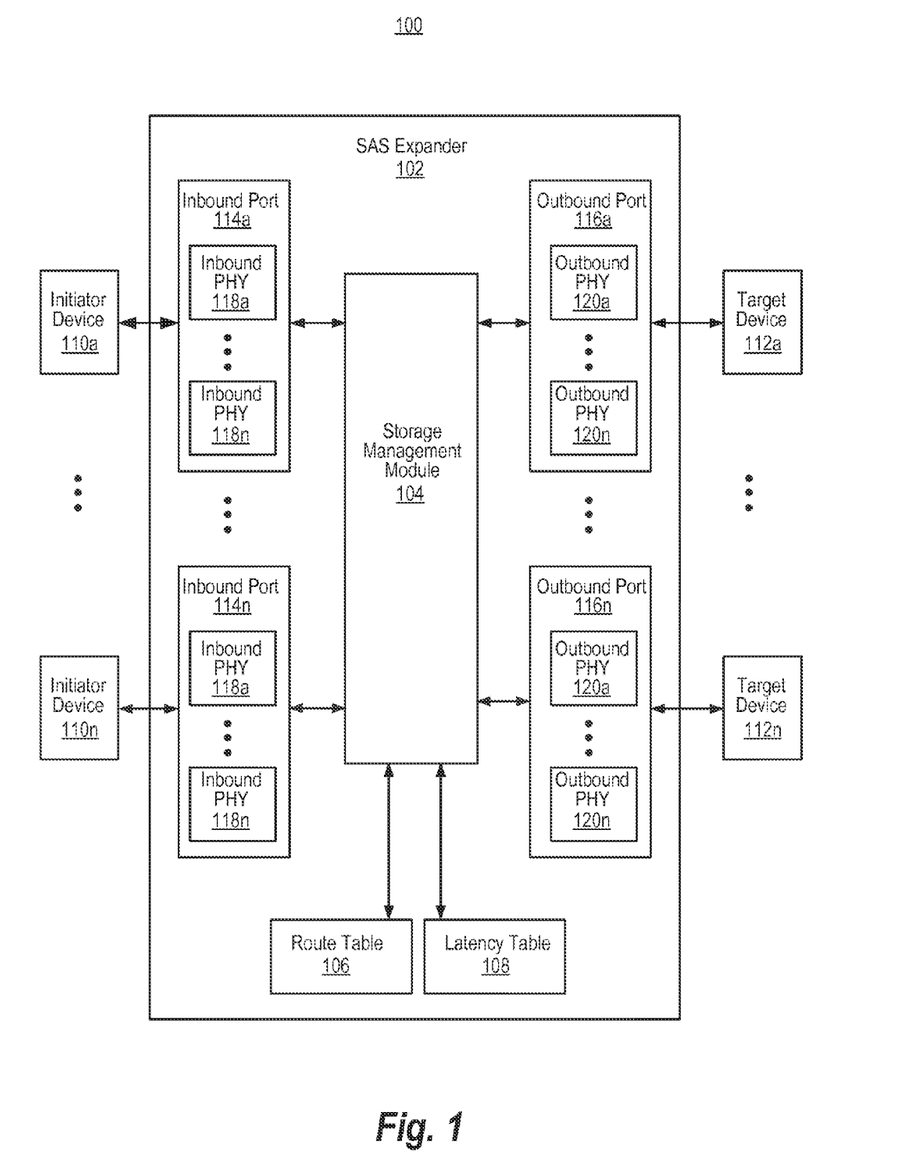
FIG. 1 is an example block diagram of a system with a SAS expander for latency based routing in accordance with the techniques of the present application.

FIG. 1 is an example block diagram of a system 100 comprising a SAS expander 102 configured for latency based routing between initiator devices 110 and target devices 112 in accordance with the techniques of the present application.

The initiator devices 110 (110a-110n) may include or be configured to operate as data processing devices capable of generating requests for establishing connections for communications including exchanging data with other devices on the fabric. The initiator devices 110 may be capable of generating multiple connection requests directed to storage resources associated with multiple target devices 112. The Initiator devices 110 may comprise hosts or server computers with array controllers to enable access and communicate with other devices on the SAS fabric. The array controllers can comprise storage controllers such as disk array controllers which can manage physical disk drives and can present them to the servers as logical units. In some examples, array controllers can implement redundant array of independent disks (RAID) functionality and may be referred to as RAID controllers.

The target devices 112 (112a-112n) may include or be configured to operate as data processing devices capable of communication with expander 102 and manage storage resources with functionality for storage of data and for subsequent retrieval by initiator devices 110 or other devices. For example, target devices 112 may include storage resources as storage drives, such as disk drives, solid state drives, and the like.

The SAS expander 102 is shown comprising a storage management module 104 configured to manage the operation of expander communication with initiator devices 110 and target devices 112 and can include functionality to manage inbound ports 114, outbound ports 116, route table 106 and latency table 108.

The inbound ports 114 (114a-114n) can include SAS interfaces for providing connections for communication between initiator devices 110 and expander 102. The inbound ports 114 can include one or more inbound PHYs 118 (118a-118n) which can comprise SAS protocol structures with transceivers for exchanging data and requests or commands between initiator devices 110 and expander 102. In a similar manner, outbound ports 116 can include SAS interfaces for providing connections for communication between target devices 112 and expander 102. The outbound ports 116 can include one or more outbound PHYs 120 (120a-120n) which can comprise SAS protocol structures with transceivers for exchanging data and requests or commands between target devices 112 and expander 102. Although not shown, in one example, expander 102 may include inbound tables that map information about inbound PHYs 118 of inbound ports 114 with corresponding initiator devices 110 and associated initiator requests. In a similar manner, expander 102 may include outbound tables that map information about outbound PHYs 120 of outbound ports 116 with corresponding target devices 112 identified in the initiator requests.

The storage management module 104 can include functionality to configure inbound ports 114 and outbound ports 116 to facilitate communication between initiator devices 110 and target devices 112. For example, storage management module 104 can configure inbound ports 114 by designating inbound PHYs 118 as being associated or configured to receive input connection requests for communication from initiator devices 110. In a similar manner, storage management module 104 can configure outbound ports 116 by designating outbound PHYs 120 as being associated or configured to receive and forward or route connection requests for communication between initiator devices 110 and target devices 112.

The storage management module 104 can include functionality to perform a discovery process of system 100 sometimes referred to as a self-configuration process of a SAS environment or fabric. For example, upon boot up or power up of expander 102, storage management module 104 can proceed to discover or check for devices attached to expander 102 as part of the SAS topology or SAS fabric. The storage management module 104 can send SAS discovery commands to devices and wait for responses from devices attached to expander 102, such as target devices, initiator devices as well as other expanders, to discover whether such devices are attached to expander 102 In one example, on the inbound side, storage management module 104 can perform the discovery process and discover whether one or more initiator devices 110 are attached to inbound PHYs 118 of inbound ports 114. In a similar manner, on the outbound side, storage management module 104 can perform the discovery process and discover whether one or more target devices, expander devices or other devices are attached to outbound PHYs 120 of outbound ports 116. In one example, storage management module 104 can perform the discovery process by further checking for devices attached to expander 102, such as other expanders, until the process determines that it has reached end devices such target devices 112. The storage management module 104 can determine or discover the destination addresses of target devices 112 attached to expander 102. The storage management module 104 can use the destination addresses to establish connections for communication to route data in response to connection requests from initiator devices 110 to target devices 112. The storage management module 104 can store the destination addresses of target devices 112 associated outbound PHYs into route table 106 for subsequent use in routing data between initiator devices 110 and target devices 112.

The storage management module 104 can include functionality to configure latency table 108 with information such as latency values associated with connections for communication between inbound PHYs 118 associated with initiator devices 110 and outbound PHYs 120 associated with target devices 112. In one example, latency table 108 can be a data structure to store a plurality of latency values and weighted averages of latency values associated with connections. In one example, latency values can be based on amount of time to establish connections between inbound PHYs and outbound PHYs and amount of time connections remain open for communication between inbound PHYs and outbound PHYs. For example, storage management module 104 can calculate or measure latency values by measuring or counting the number of arbitration in progress (AIP) primitives after sending or forwarding an Open Address Frame command to target devices. The AIP primitives may include data structures in accordance with the SAS protocol or specification and comprise low level 4 byte sequences communicated or exchanged between connections or links between expanders and devices. In contrast, SAS based commands may include additional requirements such as multiple frames and other communication overhead. In another example, storage management module 104 can calculate or measure the amount of time the connection remains open by calculating the difference between the time a Close primitive is sent to the target device and the time an Open Accept primitive is received from the target device.

For example, to illustrate, it can be assumed that one of initiator devices 110 desires to communicate with one of target devices 112. In this case, the initiator device proceeds to send expander 102 a request or command to establish or open a connection for communication to route data between the initiator device and the target device. In one example, the request can include a command to exchange data between one of the initiator devices 110 and one of the target devices 112. The storage management module 104 can respond by examining route table 106 to determine candidate or possible outbound PHYs and corresponding destination addresses that are available for routing data between inbound PHYs associated with initiator device 110 and outbound PHYs associated with target device 112. The storage management module 104 can include a random number generator to generate a random number based on weighted average of latency values to select an outbound PHY to route data to the target device. To illustrate, it can be assumed that storage management module 104 selects a particular outbound PHY to establish a connection to route data between inbound PHY and outbound PHY associated with target device. The storage management module 104 can then send the connection request across the selected outbound PHY to target device 112.

The storage management module 104 can monitor the connection and check or calculate the amount of time the connection request is taking to reach the target device. After storage management module 104 sends the connection request to the target device, it waits or monitors for an acknowledgment or notification from the target device indicating whether the connection request was successful. The storage management module 104 may include a timer generator module to initiate or start a timer with a time period to wait for a response from a connection request before the time period expires. If the topology of system 100 experiences problems with the connection request that prevents a connection, the time period may expire indicating the connection request was not successful. The storage management module 104 may be configured to expect to receive from target device acknowledgments in the form of AIP primitives within particular time periods such as 2 milliseconds (ms), for example. Once storage management module 104 receives AIP primitives, it can reset the timer and the time period generated by the timer generator module. If storage management module 104 does not receive notifications in the form of AIP primitives within the time period, then it can consider the connection request as failed or unsuccessful. During this time, storage management module 104 can count the number of AIP primitives starting from the time it first sent the connection request to target device 112. In addition, the larger the number of AIP primitives counted then the longer the time period or connection latency to establish a connection between an initiator device 110 and target device 112. When target device 112 accepts the connection request, it can send back an Open Accept primitive to expander 102. At this point, storage management module 104 can calculate the latency value of the connection by measuring the difference between the time it sent the connection request and the time when it received the connection request acknowledgment in the form of the Open Accept primitive from target device 112.

In another example, storage management module 104 can calculate a plurality of latency values based on a plurality of connection requests over different time periods and then calculate an average of these latency values. The storage management module 104 can also calculate weighted averages based on the latency values. The storage management module 104 can store the latency values and weighted average of the latency values in latency table 108 for later use in generating random values for use in selecting outbound PHYs for establishing connections between initiator devices and target devices. In one example, to illustrate, it can be assumed that storage management module 104 calculated a latency value of 20 ms for an outbound PHY for a first connection request, a latency value of 40 ms for an outbound PHY for a second connection request and a latency value of 40 ms for an outbound PHY for a third connection request. The storage management module 104 can then calculate weighted averages by taking the sum of the latency values, in this case, a total of 100 ms=(20 ms for the first connection+40 ms for the second connection+40 ms for the third connection), and then dividing the total average latency value of 100 ms by each of the individual latency values 20 ms, 40 ms, 40 ms resulting in respective normalized weighted average values of 5=(100 ms/20 ms) for the first connection, 2=(100 ms/40 ms) for the second connection, and 2=(100 ms/40 ms) for the third connection. As explained below in further detail, in one example, storage management module 104 can generate a random number based on the weighted average of the latency values, in this case, a random number between 1 through 9 based on the range of weighted average values, and use the random number to select an outbound PHY to establish a connection to route data from an initiator device 110 to a target device 112. For example, if the random number is a value from 1 to 5, then storage management module 104 can select the outbound PHY of the first connection. If the random number is a value of 6 or 7, then storage management module 104 can selects the outbound PHY of the second connection. In a similar manner, if the random number is a value of 8 or 9, then storage management module 104 can select the outbound PHY of the third connection.

In other words, storage management module 104 can be configured to track the latency or amount of time to establish connections including the amount of time the connections remain open between an initiator and target device. For example, storage management module 104 can select an outbound PHY to open or establish a connection between an initiator 110 and target 112. The storage management module 104 can then count the number of AIP primitives once the connection request is sent to the target device to provide a measurement or indication of the latency or the length of time to establish the connection. Once the connection is established, storage management module 104 can route or forward any subsequent read and write commands from initiator devices 110 directed to target devices 112. The storage management module 104 can also track the length of time initiator device 110 is maintaining open the connection. Therefore, storage management module 104 can track the amount of time to establish a connection and the amount of time the connection has been used thereby providing an indication of the amount of time the outbound PHYs have been in use for the connection.

The storage management module 104 can include functionality to manage connections for communication between initiator devices 110 and target devices 112. For example, storage management module 104 can check or monitor for commands from initiator devices 110 associated with inbound PHYs 118 to route data to target devices 112 associated with outbound PHYs 120. For example, initiator devices 110 can send to expander 102 requests to establish connections to communicate with target devices which can include commands to exchange data between the initiator devices and the target devices, requests or commands for initiators read data from and write data to the target devices, or other similar commands. Once a connection is established as explained above, storage management module 104 may reserve the corresponding inbound PHYs and outbound PHYs connections for future communication requests. In one example, once the connections are reserved for future communication, the initiator devices 110 can freely communicate with one of target devices 112 without the need for expanders to arbitrate for a connection for communication. That is, it reduces the need for expander 102 to contend for these resources once the connection has been established and reserved. In another example, storage management module 104 can reserve the connection indefinitely which results in the connection being unavailable for use by other devices. In other words, storage management module 104 can establish a connection for communication by sending an Open Address Frame primitive to a target device and then waiting for an Open Accept primitive from the target device thereby establishing the connection. Once the connection is established, storage management module 104 can route to target devices commands such as commands to read and write data managed by the target devices. On the other hand, storage management module 104 can release the connection by sending a Close primitive to target device 112 and waiting for a response from the target device.

The storage management module 104 can include functionality to select from latency table 108 random outbound PHYs from among the plurality of outbound PHYs 120 to establish connections with associated target devices 112 and route data to the target devices. In one example, the random selection can be based on weighted average of latency values associated with connections between inbound PHYs associated with initiator devices and outbound PHYs associated with target devices. The storage management module 104 can include a random number generator or other similar means to generate a random number based on the weighted average of the latency values and use the random number to select an outbound PHY to establish a connection for communication of data between one of initiator devices 110 and one of target devices 112. As explained above, in one example, storage management module 104 can generate a random number based on the weighted average values, in the above case, a random number between 1 through 9, and use the random number to select an outbound PHY to establish a connection to route data from an initiator device 110 to a target device 112. For example, if the random number is a value from 1 to 5, then storage management module 104 can select the outbound PHY of the first connection. If the random number is a value of 6 or 7, then storage management module 104 can select the outbound PHY of the second connection. In a similar manner, if the random number is a value of 8 or 9, then storage management module 104 can select the outbound PHY of the third connection.

The system 100 of FIG. 1 shows one example of a SAS fabric with an expander 102 for establishing connections between initiator devices 110 and target devices 112. However, it should be understood that this configuration is for illustrative purposes and that a different number and arrangement of devices can be employed to implement the techniques of the present application. For example, system 100 can include a plurality of expanders connected between expander 102 and target devices 112 to establish multiple path topologies. In another example, expander 102 shows one route table 106 and latency table 108 but the expander can include a plurality of route tables and latency tables. The system 100 is shown as SAS fabric comprising expander 102 configured to communicate with initiator devices 110 and target devices 110 which are capable of implementing the SAS protocol specification. However, the techniques of the present application can employ other protocols such as Fibre Channel, Ethernet and the like. The functionality of the components of system 100, such as storage management module 104, can be implemented in hardware, software or a combination thereof.

Figure 2:
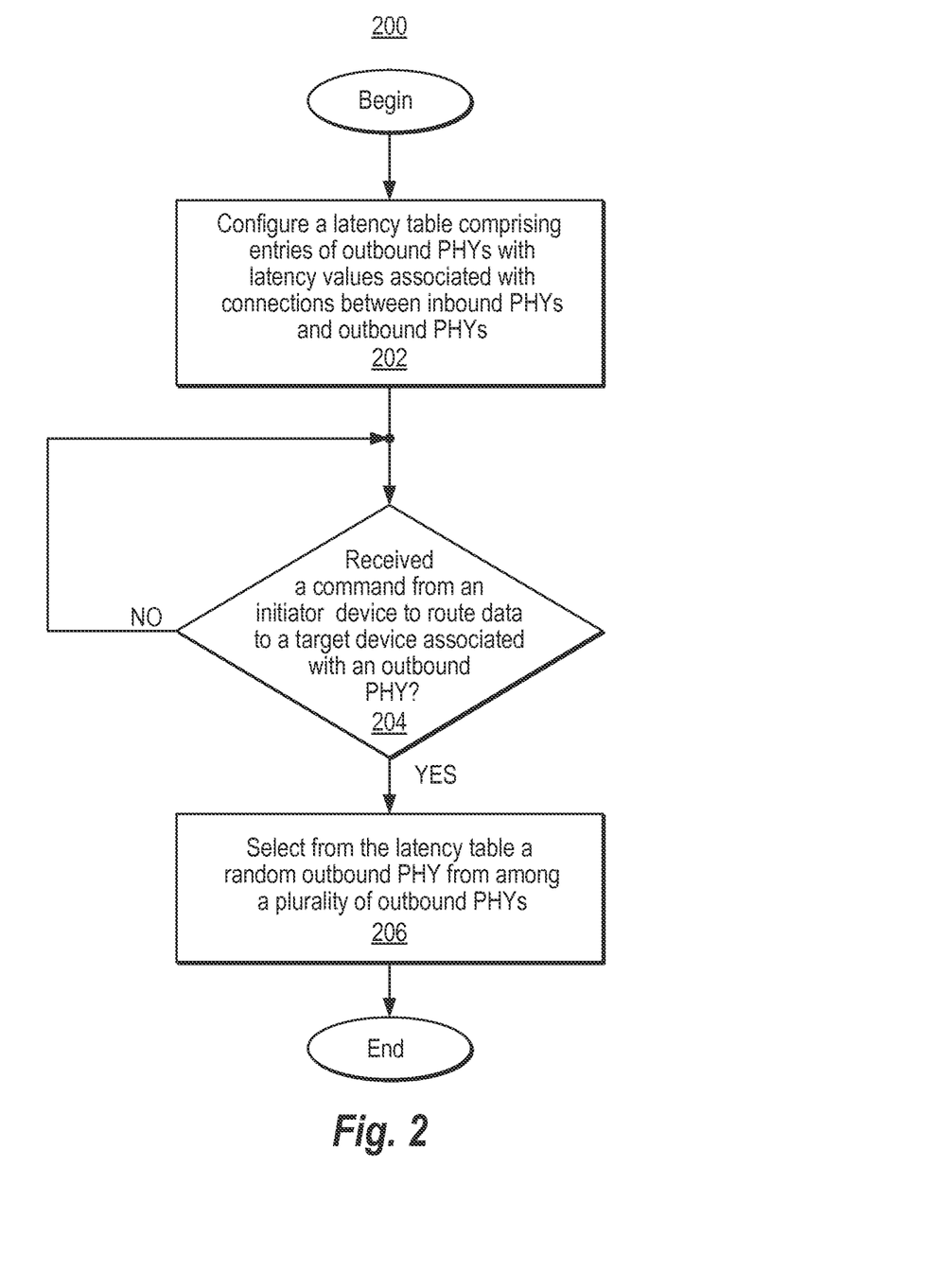
FIG. 2 is an example process flow diagram of a method of operating a SAS expander for latency based routing in accordance with the techniques of the present application.

FIG. 2 is an example process flow diagram of a method 200 of operating a SAS expander for latency based routing in accordance with the techniques of the present application. In one example, to illustrate, the method 200 is employed with example system 300 for latency based routing in accordance with the techniques of the present application. The system 300 of FIG. 3 includes an expander 302 having similar functionality to expander 102 of system 100 of FIG. 1. For example, expander 302 includes a storage management module 316, route table 330, latency table 332, inbound port 314 with PHYs for connection to initiator devices, and outbound ports 318, 320 with PHYs for connection to end devices including target devices and other expanders. It should be understood that the configuration of system 300 is for illustrative purposes and that other arrangements can employed to implement the techniques of the present application.

Figure 3:
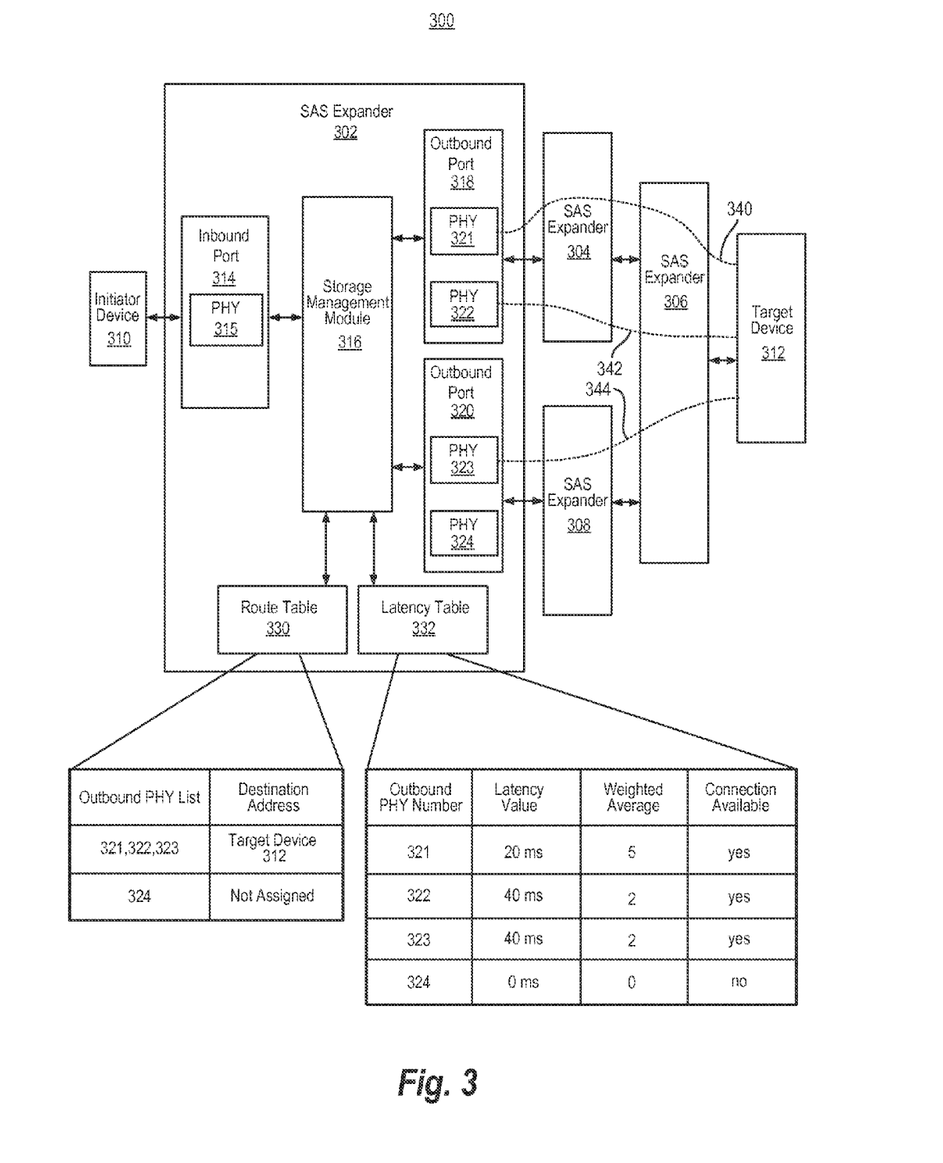
FIG. 3 is another example block diagram of a system with a SAS expander for latency based routing in accordance with the techniques of the present application.

The expander 302 can configure a plurality of ports comprising PHYs designated as inbound PHYs and designated as outbound PHYs. In one example, to illustrate operation, storage management module 316 can perform a discovery process to discover or check devices attached to expander 302 as part of system 100 configured as a SAS topology or SAS fabric. In one example, on the inbound side, storage management module 316 can discover initiator device 310 attached to inbound PHY 315 of inbound port 314. In addition, on the outbound side, storage management module 316 discovers another expander 304 attached to outbound PHY 321 of outbound port 318 of expander 302 and further discovers that the expander 304 is further attached to a subsequent expander 306 which is in turn attached to target device 312, thereby forming a first path shown by arrow 340. In a similar manner, on the outbound side, storage management module 316 discovers that another expander 304 is attached to outbound PHY 322 of outbound port 318 and further discovers that the expander 304 is further attached to a subsequent expander 306 which is in turn attached to target device 312, thereby forming a second path shown by arrow 342. In a similar manner, on the outbound side, storage management module 316 discovers that another expander 308 is attached to outbound PHY 323 of outbound port 320 and further discovers that the expander 308 is further attached to a subsequent expander 306 which is in turn attached to target device 312, thereby forming a third path shown by arrow 344. In this manner, system 100 is configured as a multiple path or multiple loop arrangement of expander 302 to target 312.

In other words, storage management module 316 performs the discovery process by continuing to check for devices attached to expander 302 until the process determines that it has reached an end device such as target device 312. In this case, storage management module 316 discovers that system 300 is configured to have a multiple path arrangement comprising a first path 340 formed from outbound PHY 321 to target device 312 (comprising path from expander 302, expander 304, expander 306 and target device 312), second path 342 formed from outbound PHY 322 to target device 312 (comprising path from expander 302, expander 304, expander 306 and target device 312) and third path 344 formed from outbound PHY 323 to target device 312 (comprising path from expander 302, expander 308, expander 306 and target device 312).

In this case, to illustrate, storage management module 316 configures inbound port 314 by designating one of the PHYs associated with the inbound port as inbound PHY 315. Further, in this case, to illustrate, storage management module 316 configures outbound port 318 including designating one or more PHYs associated with the outbound port as outbound PHY 321 and outbound PHY 322. In a similar manner, storage management module 316 configures outbound port 320 by designating one or more PHYs associated with the outbound port as outbound PHY 323 and outbound PHY 324. In addition, storage management module 316 discovers or determines the destination address associated with target device 312 which the storage management module uses to route data associated with requests from initiator device 310 to target device 312. The storage management module 316 stores the destination address of target device 312 into the Destination Address column of route table 330 and stores the names of outbound PHYs 321, 322, 323, which are attached to the target device, into the Outbound PHY List column of the route table. On the other hand, in this case to illustrate, storage management module 316 determines or discovers that outbound PHY 324 has no destination address because it is not attached to target device 312. In this case, storage management module 316 stores the name of outbound PHY 324 into the Outbound PHY List column of route table 330 but does not enter a destination address into the Destination Address column of the route table.

The method may be begin at block 202, where expander 302 configures a latency table comprising entries of outbound PHYs with latency values associated with connections between inbound PHYs and outbound PHYs. Continuing with the example above, storage management module 316 determine that outbound PHY 321, PHY 322 and PHY 323 are attached to an end device, in this case, target device 312 and that outbound PHY 324 is not attached to an end device. In one example, latency table 332 can include an Outbound PHY Number column for identifying outbound PHYs, a Latency Value column to list latency values of connections associated with outbound PHYs, a Weighted Average column for providing the weighted average values of the latency values of outbound PHYs, and a Connection Available column for indicating whether the outbound PHYs are available for connection for communication between inbound PHYs and outbound PHYs associated with target device 312. In one example, upon power up or boot up of expander 302, storage management module 316 can initialize latency table 332 by setting the Latency Values to values of "0", setting the Weighted Average to values of "1", and setting the Connection Available to values of "yes" indicating that associated connections are available.

In one example, as explained above, once storage management module 316 initializes latency table 332, it proceeds to populate the latency table with latency values. In one example, storage management module 316 can calculate latency values based on amount of time taken to establish connections between inbound PHYs and outbound PHYs. In another example, the latency values can include amount of time the connections remain open for communication between the inbound PHYs and outbound PHYs. For example, storage management module 316 can calculate or measure the latency to establish connections by counting the number of AIP primitives received from end devices, such as target device 312, after forwarding the Open Address frame. In another example, storage management module 316 can calculate or measure the amount of time the connection is open by calculating the difference between the time the Close primitive is sent to a target device and the time when the Open Accept primitive is received from the target device.

For example, to illustrate, it can be assumed that initiator device 310 intends to communicate with target device 312 and proceeds to send expander 302 a request or command to establish or open a connection to route data between the initiator device and the target device. In one example, the request can include a request or command to exchange data between initiator deice 310 and target device 312, a request or command to have the initiator read data from and write data to the target device, or other similar request or command. The storage management module 316 can respond by examining route table 330 to determine candidate outbound PHYs for establishing a connection and corresponding destination addresses that are available for routing data between inbound PHY 315 associated with initiator device 310 and an outbound PHY associated with target device 312.

The storage management module 316 can proceed next to generate a random number based on Weighted Average of latency values from latency table 332 to select an outbound PHY to establish a connection to route data to target device 312. In this case, since the Latency Values are initialized to "0" and the Weighted Average values are initialized to "1", each outbound PHY has an equal probability of being selected. For example, to illustrate, it can be assumed that storage management module 316 can generate a random number "1" and so the storage management module can select outbound PHY 321 to establish a connection to route data between inbound PHY 315 and outbound PHY 321 associated with target device 312. The storage management module 316 then sends the connection request across outbound PHY 321 to expander 304. The storage management module 316 monitors the connection and checks or calculates the amount of time the connection request is taking to reach target device 312. After expander 302 sends the connection request to expander 304, storage management module 316 waits or monitors for an acknowledgment or notification from expander 304 indicating whether the connection request was successful. The storage management module 316 may generate a timer with a time period to wait for a response from a connection request before the time period expires. If the topology of system 300 causes expander 304 to experience problems with the connection request, the time period may expire indicating the connection request was not successful. The storage management module 316 may be configured to expect to receive from expander 304 acknowledgments in the form of AIP primitives with particular time periods such as 2 ms, for example. If storage management module 316 does not receive notifications in the form of AIP primitives within the time period, then the storage management module can consider the connection request as failed or unsuccessful.

During this time period, expander 304 is attempting to select or arbitrate for PHYs associated with expander 304 and sends AIP primitives back to expander 302. If the connection between expander 302 and expander 304 is successful, then expander 304 sends or forwards the connection request to expander 306 which in turn attempts to establish a connection with target device 312. In the meantime, expander 306 sends AIP primitives to expander 304 which in turns sends the primitives to expander 302. The expander 306 sends the connection request to target device 312. If target device 312 is not ready or available to communicate, then it responds by sending AIP primitives back to expander 306 which then is sent or forwarded to expander 302 through expander 304. During this time, expander 302 is counting the number of AIP primitives starting from the time it first sent the connection request to expander 304. In addition, the larger the number of AIP primitives received by expander, then the longer the time period or connection latency to establish a connection between initiator device 310 and target device 312. Finally, when target device 312 accepts the connection request, it sends back to expander 306 an Open Accept primitive which is forwarded to expander 304 and then forwarded to expander 302. At this point, storage management module 316 can calculate the connection latency by measuring the difference between the time it sent the connection request and the time when it received the connection request acknowledgment in the form of the Open Accept primitive from target device 312.

In one example, storage management module 316 may generate a plurality of latency values from connection requests over different time periods and then calculate an average of these latency calculations and use this average value as the Latency Values in latency table 332. For example, to illustrate, if the connections experienced latency values of 10 ms, 20 ms and 30 ms then the average latency value is 20 ms=((10 ms+20 ms+30 ms)/3)). In another example, to illustrate calculation of Weighted Average, it can be assumed that storage management module 316 calculated a latency value of 20 ms for the connection request between inbound PHY 315 of initiator device 310 and outbound PHY 321 associated with target device 312 as shown in latency table 332. In another example, to illustrate, it can be assumed that storage management module 316 calculated a connection latency value of 40 ms for the connection requests related to outbound PHY 322 and outbound PHY 323 as shown in latency table 332.

In another example, to illustrate, storage management module 316 can then calculate the Weighted Average values by taking the sum of the Latency Values, in this case, 100 ms=(20 ms for outbound PHY 321+40 ms for outbound PHY 322+40 ms for outbound PHY 323), and then dividing by each of the individual latency values 20 ms, 40 ms, 40 ms resulting in respective normalized Weighted Average values of 5=(100 ms/20 ms), 2=(100 ms/40 ms), 2=(100 ms/40 ms) as shown in latency table 332. As explained below in further detail, storage management module 316 can generate a random number based on the Weighted Average values, in this case, a random number between 1 through 9, and use the random number to select an outbound PHY to establish a connection to route data between initiator device 310 and target device 312, in one example. In other words, storage management module 316 can track the latency or amount of time that connections have been established including the amount of time the connections remain open between an initiator and target device. For example, storage management module 316 can use outbound PHY of expander 302 to open or establish a connection between initiator 310 and target 312 and then can measure or count the number of AIR primitives to provide an indication of the latency or the length of time to establish the connection. Once the connection is established, initiator 310 can send read and write commands. The storage management module 316 can also track the length of time initiator 310 is holding on to the connection. Therefore, storage management module 316 can track the amount of time to establish a connection and the amount of time the connection has been use thereby providing an indication of the amount of time the outbound PHYs have been in use for the connection.

At block 204, expander 302 checks whether it has received a command from an initiator device associated with an inbound PHY to route data to a target device associated with an outbound PHY. For example, if storage management module 316 does not receive a command, then processing proceeds back to block 204 where expander 302 continues to monitor or check for commands to communicate with target device. On the other hand, if storage management module 316 does receive a command, then the storage management module proceeds to process the command. For example, initiator device 310 can send a request which can include a command to exchange data between the initiator device and target device 312, a request or command to have the initiator read data from and write data to the target device, or other similar command. Once a connection is established as explained above, storage management module 316 may reserve the corresponding inbound PHYs and outbound PHYs for the subsequent connections. In one example, initiator device 310 can freely communicate with target device 312 without the need for expanders to arbitrate for a connection.

That is, it may not be necessary for expander 302, or any other expander between the expander 302 and target deice 312 to contend for these resources once the connection is established. In another example, storage management module 316 can reserve the connection indefinitely which may result in the connection being unavailable for use by other devices. On the other hand, storage management module 316 can release the connection by sending a Close primitive to expander 304 which is then forwarded to expander 306 and finally to target device 312. The target device 312 can respond by sending a Close primitive back to expander 306 which is forwarded to expander 304 and finally to expander 302 which causes the connection to be terminated thereby making the resources and devices available for other devices such as other initiators. In another words, storage management module 316 can use an Open Address Frame primitive to establish a connection and then wait for an Open Accept primitive from the target device thereby establishing the connection. Once the connection is established, storage management module 316 can send read and write frame commands, which are routed through expanders, to exchange data with target device 312.

At block 206, expander 302 selects from latency table 332 a random outbound PHY from among a plurality of outbound PHYs. In one example, the random selection is based on a Weighted Average of Latency Values of the outbound PHY entries of the latency table 332. In another example, storage management module 316 can select an outbound PHY having the lowest value Latency Value compared to the plurality of outbound PHYs with higher value Latency Values. As explained above, in one example, to illustrate, storage management module 316 can generate a random number based on the Weighted Average Values. Continuing with the above example, storage management module 316 can generate random a number between 1 through 9 and use the random number to select an outbound PHY to establish a connection to route data between initiator device 310 and target device 312. In this case, if storage management module 316 generates random numbers 1 or 2 or 3 or 4 or 5, then it selects outbound PHY 321 to establish a connection. On the other hand, if storage management module 316 generates random numbers 6 or 7, then it selects outbound PHY 322 to establish a connection. In a similar manner, if storage management module 316 generates random numbers 8 or 9, then it selects outbound PHY 323 to establish a connection.

In this manner, the probability of selecting outbound PHY 321 is increased or higher relative to the probability of selecting outbound PHY 322 or outbound PHY 323 which have the same probability of being selected because they have the same average weighted value. For example, the probability of generating a number 1, 2, 3, 4, 5 to select outbound PHY 321 is more than 50% (5/9) while the probability of generating a number 6 or 7 to select outbound PHY 322 is about 20% (2/9) and the probability of generating a number 8 or 9 to select outbound PHY 323 is also about 20% (2/9). In this manner, the probability of selecting outbound PHY 321 is increased because more random numbers are assigned or mapped to this outbound PHY from a random number generation perspective. In another example, storage management module 316 can calculate information related to connections such as Latency Values and Weighted Averages of the Latency Values and then update latency table 332. In this manner, storage management module 316 can refresh latency table 332 with the updated or the latest latency information.

Figure 4:
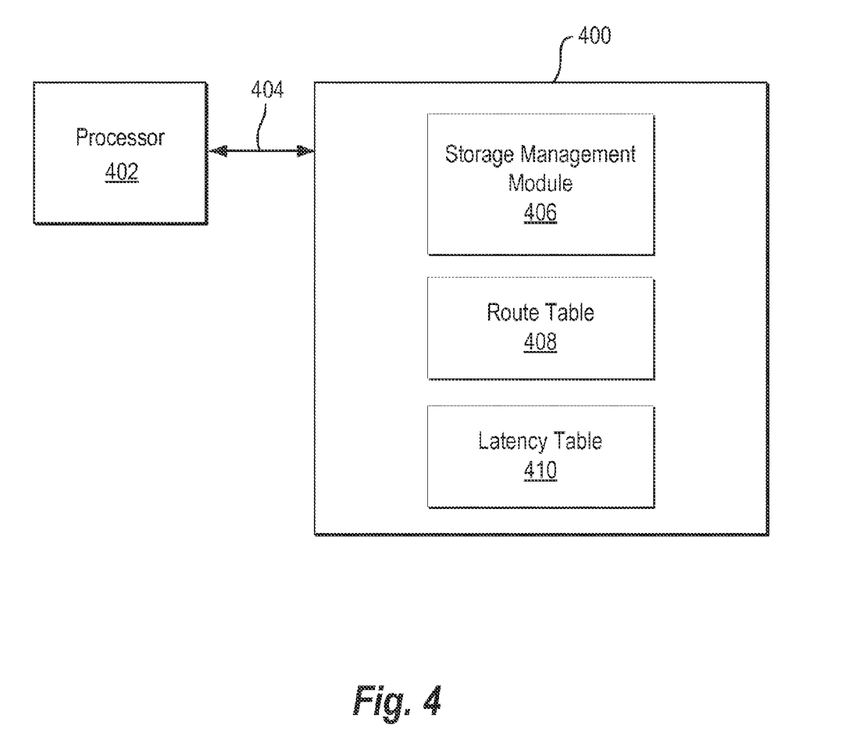
FIG. 4 is an example block diagram showing a non-transitory, computer-readable medium that stores instructions for operating a SAS expander for latency based routing in accordance with the techniques of the present application.

FIG. 4 is an example block diagram showing a non-transitory, computer-readable medium that stores instructions for operating a SAS expander for latency based routing in accordance with the techniques of the present application. The non-transitory, computer-readable medium is generally referred to by the reference number 400 and may be included in SAS expander 102 of the SAS fabric described in relation to FIG. 1 and SAS expander 302 in relation to FIG. 3. The non-transitory, computer-readable medium 400 may correspond to any typical storage device that stores computer-implemented instructions, such as programming code or the like. For example, the non-transitory, computer-readable medium 400 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

A processor 402 generally retrieves and executes the instructions stored in the non-transitory, computer-readable medium 400 to operate the SAS expander in accordance an example. In an example, the tangible, machine-readable medium 400 can be accessed by the processor 402 over a bus 404. A first region 406 of the non-transitory, computer-readable medium 400 may include storage management module functionality as described herein. A second region 408 of the non-transitory, computer-readable medium 400 may include route table functionality as described herein. A third region 410 of the non-transitory, computer-readable medium 400 may include latency table functionality as described herein.

Although shown as contiguous blocks, the software components can be stored in any order or configuration. For example, if the non-transitory, computer-readable medium 400 is a hard drive, the software components can be stored in non-contiguous, or even overlapping, sectors.

What is claimed is:

1. A serial attached SCSI (SAS) expander comprising:
a latency table comprising entries of outbound PHYs with latency values associated with connections between inbound PHYs associated with initiator devices and the outbound PHYs associated with target devices; and
a storage management module to:
in response to receipt of a command from an initiator device associated with an inbound PHY to route data to a target device associated with an outbound PHY, select from the latency table a random outbound PHY from among the outbound PHYs, wherein the random selection is based on weighted average values of the latency values of the entries of the outbound PHYs of the latency table, wherein the latency values are calculated based on a difference in time between when a Close primitive is sent to the target device and an Open Accept primitive is received from the target device.

2. The SAS expander of claim 1, wherein the storage management module is configured to calculate latency values and update the latency table with the latency values that are calculated.

3. The SAS expander of claim 1, wherein the storage management module is configured to select the outbound PHYs with lower latency values compared to the outbound PHYs with higher latency values.

4. The SAS expander of claim 1, wherein the storage management module is configured to generate a random number to select the random outbound PHY, wherein an outbound PHY with a weighted average greater than a weighted average of another outbound PHY has a greater probability of being selected compared to the another outbound PHY.

5. The SAS expander of claim 1, wherein the storage management module is configured to route data from the inbound PHY to the random outbound PHY that is selected using address information from a route table of the random outbound PHY that is selected.

6. The SAS expander of claim 1, wherein the storage management module is configured to, in response to receipt of a command from the initiator device associated with the inbound PHY directed to the target device associated with the outbound PHY to exchange data between the inbound PHY and the outbound PHY, exchange data between the inbound PHY and the outbound PHY.

7. A method of operating a serial attached SCSI (SAS) expander comprising:
configuring a latency table comprising entries of outbound PHYs with latency values associated with connections between inbound PHYs and the outbound PHYs; and
in response to receipt of a command from an initiator device associated with an inbound PHY to route data to a target device associated with an outbound PHY, selecting from the latency table a random outbound PHY from among the outbound PHYs, wherein the random selection is based on weighted average of the latency values of the entries of the outbound PHYs of the latency table, wherein the latency values are calculated based on a difference in time between when a Close primitive is sent to the target device and an Open Accept primitive is received from the target device.

8. The method of claim 7, further comprising calculating latency values and updating the latency table with the latency values that are calculated.

9. The method of claim 7, further comprising selecting the outbound PHYs with lower latency values compared to the outbound PHYs with higher latency values.

10. The method of claim 7, further comprising generating a random number to select the random outbound PHY, wherein an outbound PHY with a weighted average greater than a weighted average of another outbound PHY has a greater probability of being selected compared to the another outbound PHY.

11. The method of claim 7, further comprising routing data from the inbound PHY to the random outbound PHY that is selected using address information from a route table of the random outbound PHY that is selected.

12. The method of claim 7, further comprising, in response to receipt of a command from the initiator device associated with the inbound PHY directed to the target device associated with the outbound PHY to exchange data between the inbound PHY and the outbound PHY, exchange data between the inbound PHY and the outbound PHY.

13. A non-transitory computer computer-readable medium having computer executable instructions stored thereon to operate a serial attached SCSI (SAS) expander, the instructions are executable by a processor to:
configure a latency table comprising entries of outbound PHYs with latency values associated with connections between inbound PHYs and the outbound PHYs; and
in response to receipt of a command from an initiator device associated with an inbound PHY to route data to a target device associated with an outbound PHY, select from the latency table a random outbound PHY from among the outbound PHYs, wherein the random selection is based on weighted average values of the latency values of the entries of the outbound PHYs of the latency table, wherein the latency values are calculated based on a difference in time between when a Close primitive is sent to the target device and an Open Accept primitive is received from the target device.

14. The non-transitory computer readable medium of claim 13 further comprising instructions that when executed cause the processor to:
calculate latency values and updating the latency table with the latency values that are calculated.

15. The non-transitory computer readable medium of claim 13 further comprising instructions that when executed cause the processor to:
select the outbound PHYs with lower latency values compared to the outbound PHYs with higher latency values.

16. The non-transitory computer readable medium of claim 13 further comprising instructions that when executed cause the processor to:
generate a random number to select the random outbound PHY, wherein an outbound PHY with a weighted average greater than a weighted average of another outbound PHY has a greater probability of being selected compared to the another outbound PHY.

17. The non-transitory computer readable medium of claim 13 further comprising instructions that when executed cause the processor to:
route data from the inbound PHY to the random outbound PHY that is selected using address information from a route table of the random outbound PHY that is selected.

* * * * *